US012714109B2

United States Patent
(12) United States Patent
Mendoza Losana et al.

(10) Patent No.: US 12,714,109 B2
(45) Date of Patent: Aug. 25, 2026

(54) REDUCING MALARIA TRANSMISSION

(71) Applicant: GlaxoSmithKline Intellectual Property Development Limited, Brentford (GB)

(72) Inventors: Alfonso Mendoza Losana, Madrid (ES); Janneth Rodrigues, Madrid (ES)

(73) Assignee: GlaxoSmithKline Intellectual Property Development Limited, Stevenage (GB)

( * ) Notice: Subject to any disclaimer, the term of this patent is extended or adjusted under 35 U.S.C. 154(b) by 623 days.

(21) Appl. No.: 17/621,434

(22) PCT Filed: Jul. 10, 2020

(86) PCT No.: PCT/EP2020/069569
§ 371 (c)(1),
(2) Date: Dec. 21, 2021

(87) PCT Pub. No.: WO2021/009050
PCT Pub. Date: Jan. 21, 2021

(65) Prior Publication Data

US 2023/0051209 A1 Feb. 16, 2023

(30) Foreign Application Priority Data

Jul. 12, 2019 (EP) .................................... 19382593
Sep. 24, 2019 (EP) .................................... 19382821

(51) Int. Cl.
*A61P 33/06* (2006.01)
*A01N 63/20* (2020.01)
*A01P 15/00* (2006.01)

(52) U.S. Cl.
CPC .............. *A01N 63/20* (2020.01); *A01P 15/00* (2021.08)

(58) Field of Classification Search
None
See application file for complete search history.

(56) References Cited

U.S. PATENT DOCUMENTS 10,815,501 B2 10/2020 Kurihara et al.
11,197,907 B2 12/2021 Nissan et al.

FOREIGN PATENT DOCUMENTS

CN 101016525 8/2007
CN 101993838 3/2011
CN 104531585 B 3/2017
JP WO2015005307 3/2017
RU 2688725 5/2019

OTHER PUBLICATIONS

LPNS, Taxonomy, *Delftia* genus, 2024 (Year: 2024).*
(Continued)

*Primary Examiner* — Thane Underdahl
*Assistant Examiner* — Mary A Crum
(74) *Attorney, Agent, or Firm* — Wei Huang

(57) ABSTRACT

The present invention relates to a composition comprising bacteria of the *Delftia* genus, specifically a composition comprising *Delftia tsuruhatensis* as well as the bacteria itself for use in the prevention of malaria transmission and methods of using the compositions for reducing malaria and/or malaria parasite transmission.

6 Claims, 2 Drawing Sheets

| 1st Experiment | Control | Test |
|---|---|---|
| Mosquitoes | 25 | 27 |
| Infection Prevalence (%) | 72 | 30 |
| Block in Transmission (%) | | 59 |
| Reduction in Oocyst (%) | | 78 |
| Mean Oocyst Intensity | 1.3 | 0.3 |

(56) References Cited

OTHER PUBLICATIONS

European centre for disease prevention and control, Facts about malaria, 2024 (Year: 2024).*
Morgan Coulson, Malaria's latest foe? Bacteria., Johns Hopkins, Published Aug. 7, 2023 (Year: 2023).*
Boissière, Anne, et al. "Midgut microbiota of the malaria mosquito vector *Anopheles gambiae* and interactions with Plasmodium falciparum infection." PLoS pathogens 8(5) (2012): e1002742. (Year: 2012).*
Official Action and Search Report (English translation) issued in corresponding Russian Patent Application No. 2022103278, 8 pages.
Chavshin et al., "Isolation and identification of culturable bacteria from wild *Anopheles culicifacies*, a first step in a paratransgenesis approach", Parasites & Vectors, 2014, vol. 7:419, 8 pages.
Office Action for corresponding Japanese Patent Application No. 2022-501360, dated Apr. 23, 2024, 8 pages.
Lindh J M et al: "Transstadial and horizontal transfer of bacteria within a colony of Anopheles gambiae (Diptera: Culicidae) and oviposition response to bacteria-containing water", Acta Tropica, Elsevier Science Bv., Amsterdam, NL, vol. 107, No. 3, Sep. 1, 2008 (Sep. 1, 2008), pp. 242-250, XP025535895.
Wei Huang et al: "Bacterial Suppression of Malaria Transmission by Mosquitoes", 68th Annual Meeting of the American Society for Tropical Medicine and Hygiene (ASTMH) ; National Harbor, MD, USA ; Nov. 20-24, 2019, (Nov. 20, 2019),p. 219, XP0557274,55.
Yin, Zhiqiu, et al. "Pan-genome analysis of Delftia tsuruhatensis reveals important traits concerning the genetic diversity, pathogenicity, and biotechnological properties of the species." Microbiology Spectrum 10.2 (2022): e02072-21.
International Search Report and Written Opinion for International Application No. PCT/EP2020/069569.
Zhou D., Microbiology Textbook, Higher Education Press, Published on May 31, 1993, p. 372, with machine translation.
Agustina Taglialegna, A mosquito symbiont takes down malaria, Nature Reviews Microbiology 21, 629 (Oct. 2023).
Giorgio D.C., et al., "In Vitro Activity of the B-carboline Alkaloids Harmane, Harmine, and Harmaline Toward Parasites of the Species *Leishmania* Infantum," Experimental Parasitology, 2004, vol. 106(3-4), pp. 67-74.
Huang W., et al., "Delftia Tsuruhatensis TC1 Symbiont Suppresses Malaria Transmission by Anopheline Mosquitoes," Science, Aug. 4, 2023, vol. 381, pp. 533-540(8 Pages).
International Search Report and Written Opinion for International Application No. PCT/EP2023/081176, mailed Feb. 20, 2024, 13 Pages.
Mohlmann W.R., et al., "Impact of Gut Bacteria on the Infection and Transmission of Pathogenic Arboviruses by Biting Midges and Mosquitoes," Microbial Ecology, 2020, vol. 80(3), pp. 703-717.

* cited by examiner

| 1st Experiment | Control | Test |
|---|---|---|
| Mosquitoes | 25 | 27 |
| Infection Prevalence (%) | 72 | 30 |
| Block in Transmission (%) | | 59 |
| Reduction in Oocyst (%) | | 78 |
| Mean Oocyst Intensity | 1.3 | 0.3 |

| 2nd Experiment | Control | Test |
|---|---|---|
| Mosquitoes | 45 | 44 |
| Infection Prevalence (%) | 78 | 27 |
| Block in Transmission (%) | | 66 |
| Reduction in Oocyst (%) | | 69 |
| Mean Oocyst Intensity | 1.7 | 0.5 |

REDUCING MALARIA TRANSMISSION

CROSS-REFERENCE TO RELATED APPLICATIONS

This application is a § 371 of International Application No. PCT/EP2020/069569, filed Jul. 10, 2020, which claims priority to EP 19382593.2 filed Jul. 12, 2019, and EP 19382821.7 filed Sep. 24, 2019, the contents of each application are hereby incorporated by reference.

FIELD OF THE INVENTION

The present invention relates to the field of malaria and provides compositions and methods useful for the prevention of malaria transmission.

BACKGROUND TO THE INVENTION

Parasitic protozoal infections are responsible for a wide variety of diseases of medical importance, including malaria.

Malaria is a mosquito-borne disease that, in humans, can be caused by five species of *Plasmodium* parasite of which *Plasmodium falciparum* (*P. falciparum*) is the most virulent. In 2018, there were an estimated 228 million people infected with malaria worldwide and malarial disease was responsible for an estimated 405,000 deaths, with young children and pregnant women being the most affected groups—11 million pregnant women in sub-Saharan Africa were infected by malaria in 2018, and children under 5 accounted for 67% of all malaria deaths (WORLD HEALTH ORGANIZATION. 2018. World malaria report. Geneva, Switzerland, World Health Organization).

The lack of vaccines and effective drugs alongside resistance to anti-malarial drugs and insecticides combined with weakened health care systems in poor underdeveloped malaria endemic countries hamper eradication efforts.

There is urgent need to develop and implement additional tools to block malaria transmission which can be integrated into existing approaches to achieve elimination objectives.

SUMMARY OF THE INVENTION

According to a first aspect of the invention there is provided a composition comprising bacteria of the *Delftia* genus.

According to a second aspect of the invention there is provided a method of reducing or preventing malaria parasite transmission, the method comprising a step of bringing one or more mosquitoes into contact with bacteria of the *Delftia* genus.

In a further aspect, the present invention provides bacteria of the *Delftia* genus for use in reducing malaria transmission.

In a still further aspect there is provided a mosquito of the *Anopheles* genus populated with *Delftia* bacteria (hereinafter referred to as a mosquito of the invention).

In specific embodiments of these aspects, the bacteria of the *Delftia* genus is *Delftia tsuruhatensis.*

The present invention may be advantageous in a number of respects. The inventors have found that bacteria of the *Delftia* genus, specifically *Delftia tsuruhatensis*, hinders the transmission of *Plasmodium* parasites in mosquitoes. When introduced into a mosquito containing environment, the compositions of the invention prevent malaria parasite transmission by inhibiting ookinetes and oocysts of *Plasmodium* in mosquito midgut. Bacteria of the *Delftia* genus, in particular *Delftia tsuruhatensis* (*D. tsuruhatensis*) may be used as a tool to combat the spread of malaria.

DESCRIPTION OF THE DRAWINGS

FIG. 2A and FIG. 2**B represent results from two independent experiments.

DETAILED DESCRIPTION OF THE INVENTION

Figure 1:
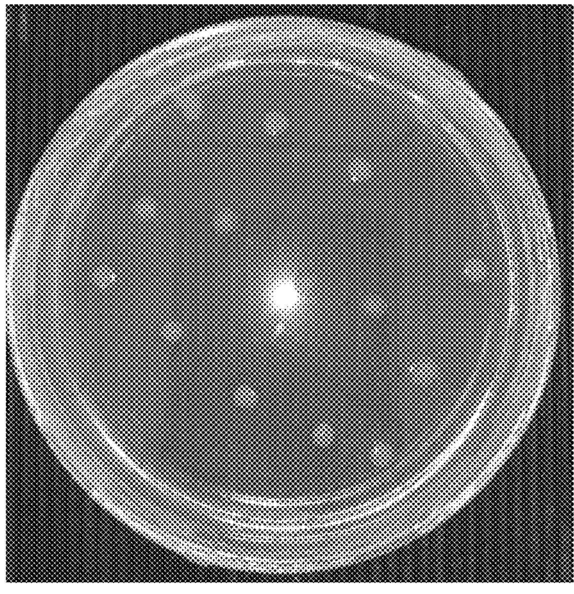
FIG. 1 shows colony morphology of *Delftia tsuruhatensis*

In one aspect, the present invention provides a composition comprising bacteria of the *Delftia* genus. *Delftia* is a genus of gram-negative motile rod bacteria, belonging to the class Betaproteobacteria and family Comamonadaceae.

The bacteria of the *Delftia* genus may be any bacteria in the *Delftia* genus. In an embodiment of the invention the bacteria of the *Delftia* genus is *D. tsuruhatensis*. Bacterium was deposited under the BUDAPEST TREATY ON THE INTERNATIONAL RECOGNITION OF THE DEPOSIT OF MICROORGANISMS FOR THE PURPOSES OF PATENT PROCEDURE (Ferguson Building, Craibstone Estate, Bucksburn, Aberdeen, AB21 9YA Scotland) on 21 May 2019, accession number NCIMB 43398. This bacterium has been isolated and identified by 16SrRNA sequencing as *D. tsuruhatensis*. It is a gram-negative bacterium belonging to the class Betaproteobacteria and the family Comamonadaceae. In an embodiment of the invention the bacteria of the *Delftia* genus is the bacteria deposited under the BUDAPEST TREATY ON THE INTERNATIONAL RECOGNITION OF THE DEPOSIT OF MICROORGANISMS FOR THE PURPOSES OF PATENT PROCEDURE (Ferguson Building, Craibstone Estate, Bucksburn, Aberdeen, AB21 9YA Scotland) on 21 May 2019, accession number NCIMB 43398.

In an embodiment of the invention the composition is suitable for reducing or preventing: (i) malaria and/or (ii) malaria parasite transmission in a mosquito. In an embodiment the composition is suitable for preventing malaria transmission in a mosquito. In another embodiment the composition is suitable for prevention malaria parasite transmission in a mosquito.

As defined herein "reducing or preventing malaria or malaria parasite transmission" is defined as precluding malaria e.g. by inhibiting mosquito stages of the malaria parasite (oocyst formation)

It has been found that *Delftia* bacteria, specifically, *D. tsuruhatensis*, can suppress malaria transmission in mosquitoes by blocking malaria parasites. Specifically, it has been shown here that, when introduced into a mosquito containing environment, *D. tsuruhatensis* can prevent malaria parasite transmission by inhibiting ookinetes and oocysts of *Plasmodiumin* mosquito midgut. Thus, compositions of the present invention may reduce or prevent malaria transmission and/or malaria parasite transmission in a mosquito.

The mosquito may be any mosquito capable of transmitting malaria e.g. mosquitoes of the *Anopheles* genus. It is envisaged that the compositions and methods of the present invention extend to any *Anopheles* species of mosquito. In an embodiment of the invention the mosquito is *Anopheles gambiae* or *Anopheles stephensi*. In an embodiment the mosquito is *Anopheles stephensi*. In another embodiment, the mosquito is *Anopheles gambiae*.

The malaria parasite may be any malaria parasite. In an embodiment the malaria parasite is a *plasmodium* parasite. In an embodiment the parasite is *Plasmodium falciparum*. In another embodiment the parasite is *Plasmodium berghei*.

The compositions of the invention may be in any suitable form and may include any suitable carrier.

The composition may be a feed composition i.e. the composition may be in a form which can be presented to a mosquito for consumption. In an embodiment the feed composition is a sugar source or nectar feed. In one embodiment the feed composition is a sugar source. The sugar source may be an attractive sugar bait or comprised within an attractive sugar bait. Attractive sugar baits comprise a sugar and a toxic ingredient. It is envisaged that an attractive sugar bait according to the invention will comprise the composition of the invention instead of the toxic ingredient i.e. will comprise sugar and a composition of the invention.

In an embodiment, the composition is in the form of a bait. The bait is designed to lure the mosquito to come into contact with the composition. In one embodiment, upon coming into contact therewith, the composition is then internalized by the mosquito, by ingestion for example. An attractant can also be used. The attractant can be a pheromone, such as a male or female pheromone. The attractant acts to lure the mosquito to the bait. The bait can be in any suitable form, such as a solid, paste, pellet or powdered form.

The baits can be provided in a suitable "housing" or "trap". Such housings and traps are commercially available and existing traps can be adapted to include the compositions of the invention. The housing or trap can, for example, be box-shaped and can be provided in pre-formed condition or can be formed of foldable cardboard for example. Suitable materials for a housing or trap include plastics and cardboard, particularly corrugated cardboard. The inside surfaces of the traps can be lined with a sticky substance in order to restrict movement of the mosquito once inside the trap. The housing or trap can contain a suitable trough inside which can hold the bait in place. A trap is distinguished from a housing because the mosquito cannot readily leave a trap following entry, whereas a housing acts as a "feeding station" which provides the mosquito with a preferred environment in which they can feed and feel safe from predators.

In a second aspect, the present invention provides a method of reducing or preventing malaria parasite transmission, the method comprising a step of bringing one or more mosquitoes into contact with bacteria of the *Delftia* genus.

In an embodiment of the invention, the bacteria of the *Delftia* genus is *Delftia tsuruhatensis*.

In another embodiment, the bacteria of the *Delftia* genus is bacteria deposited under the BUDAPEST TREATY ON THE INTERNATIONAL RECOGNITION OF THE DEPOSIT OF MICROORGANISMS FOR THE PURPOSES OF PATENT PROCEDURE (Ferguson Building, Craibstone Estate, Bucksburn, Aberdeen, AB21 9YA Scotland) on 21 May 2019, accession number NCIMB 43398.

The step of bringing the mosquitoes into contact with the bacteria may occur in any suitable way. For instance, a person does not physically have to contact a mosquito and *Delftia* bacteria, they could leave the bacteria in a place where they know it will come into contact with a mosquito.

The bacteria may be in the form of a composition of the invention as described in the first aspect of the invention.

In certain embodiments of the invention, the contacting may be achieved by treating an area with a composition of the present invention, for example, by using a spray formulation, such as an aerosol or a pump spray. In certain embodiments of the invention, an area can be treated, for example, via aerial delivery, by truck-mounted equipment, or the like. In some embodiments, the composite on is sprayed by e.g., backpack spraying, aerial spraying, spraying/dusting etc.

The mosquito may be any mosquito capable of transmitting malaria e.g. mosquitoes of the *Anopheles* genus. It is envisaged that the compositions and methods of the present invention extend to any *Anopheles* species of mosquito. In an embodiment of the invention the mosquito is *Anopheles gambiae* or *Anopheles stephensi*. In an embodiment the mosquito is *Anopheles stephensi*. In another embodiment, the mosquito is *Anopheles gambiae*.

The malaria parasite may be any malaria parasite. In an embodiment the malaria parasite is a *plasmodium* parasite. In an embodiment the parasite is *Plasmodium falciparum*. In another embodiment the parasite is *Plasmodium berghei*.

In a third aspect, the present invention provides bacteria of the *Delftia* genus for use in reducing malaria transmission. In an embodiment the bacteria of the *Delftia* genus is *Delftia tsuruhatensis*. The bacteria may be in the form of a composition as described above in the first aspect of the invention. In an embodiment, bacteria of the *Delftia* genus is for use in reducing malaria transmission in a mosquito. Herein reducing malaria transmission may also be read to mean "reducing malaria parasite transmission".

The mosquito may be any mosquito capable of transmitting malaria e.g. mosquitoes of the *Anopheles* genus. In an embodiment of the invention the mosquito is *Anopheles gambiae* or *Anopheles stephensi*. In an embodiment the mosquito is *Anopheles stephensi*. In another embodiment, the mosquito is *Anopheles gambiae*.

The malaria parasite may be any malaria parasite. In an embodiment the malaria parasite is a *plasmodium* parasite. In an embodiment the parasite is *Plasmodium falciparum*. In another embodiment the parasite is *Plasmodium berghei*.

In a further aspect of the invention, bacteria of the *Delftia* genus can be used in a disease control strategy based on the direct exposure of larval or adult stage mosquitoes to the bacterium. Exposure could be achieved through direction administration of the bacteria or via interaction of the native population of mosquitoes with mosquitoes already populated with the *Delftia* bacteria. The mosquitoes of the invention, which comprise *Delftia* bacteria, may be used as agents that can mate with, and thus transfer the bacteria to, other mosquito populations within an area. A mosquito comprising *Delftia* may readily be produced by infection of a suitable mosquito species using a desired *Delftia* strain.

Alternatively, the bacteria can be deployed directly to populate a local mosquito population. An *Anopheles* mosquito may be exposed to *Delftia* bacteria from another mosquito or directly with the bacteria itself. If directly with the *Delftia* bacteria (i.e. not via another mosquito) the bacteria may be delivered by any suitable method and in combination with a delivery agent in any suitable manner that permits administering the composition to the mosquito. For example, the mosquito can be contacted with the bacteria in a pure or substantially pure form, for example a solution containing *Delftia*.

In a particular embodiment, the bacteria of the *Delftia* genus is in a composition along with a delivery agent.

In another particular embodiment, the mosquito larval forms can be simply "soaked" or "sprayed" with a solution comprising the bacteria.

Alternatively, the composition comprising *Delftia* can be linked to a food component of a mosquito, such as artificial nectar or sugar bait, for ease of delivery and/or in order to increase uptake of the composition by the mosquito. Methods for oral introduction include, for example, directly mixing a composition with the mosquito's food, spraying the composition in the mosquito's habitat or field including standing water areas. The composition can also be incorporated into the medium in which the mosquito grows, lives, reproduces, feeds, or infests.

In another embodiment, the composition is in the form of a bait. The bait is designed to lure the mosquito to come into contact with the composition. In one embodiment, upon coming into contact therewith, the composition is then internalized by the mosquito, by ingestion for example. The bait can depend on the species being targeted. An attractant can also be used. The attractant can be a pheromone, such as a male or female pheromone. The attractant acts to lure the mosquito to the bait. The bait can be in any suitable form, such as a solid, paste, pellet or powdered form.

The baits can be provided in a suitable "housing" or "trap". Such housings and traps are commercially available and existing traps can be adapted to include the compositions of the invention. The housing or trap can be box-shaped for example, and can be provided in pre-formed condition or can be formed of foldable cardboard for example. Suitable materials for a housing or trap include plastics and cardboard, particularly corrugated cardboard. The inside surfaces of the traps can be lined with a sticky substance in order to restrict movement of the mosquito once inside the trap. The housing or trap can contain a suitable trough inside which can hold the bait in place. A trap is distinguished from a housing because the mosquito cannot readily leave a trap following entry, whereas a housing acts as a "feeding station" which provides the mosquito with a preferred environment in which they can feed and feel safe from predators.

In certain embodiments of the invention, an area can be treated with a composition of the present invention, for example, by using a spray formulation, such as an aerosol or a pump spray. In certain embodiments of the invention, an area can be treated, for example, via aerial delivery, by truck-mounted equipment, or the like. In some embodiments, the composite on is sprayed by e.g., backpack spraying, aerial spraying, spraying/dusting etc.

Mosquitoes in accordance with the present invention are unable to transmit malaria parasites, thus making them suitable agents for use to prevent malaria transmission in addition to the direct use of the *Delftia* bacteria.

It is envisaged that the present invention is deployed along with other malaria eradication efforts. For example, the compositions, methods and bacteria for use of the present invention may be used alongside known anti-malarial agents. In an embodiment, the compositions or bacteria for use of the present invention may be used in combination with one, two or three additional anti-malarial agents. Integrated Vector Management (IVM) suggests making full use of the tools available.

The at least one other anti-malarial agent may also be selected from ferroquine, KAF156, cipargamin, DSM265, artemisone, artemisinone, artefenomel, MMVO48, SJ733, P218, MMV253, PA92, DDD498, AN13762, DSM421, UCT947, ACT 451840, OZ609, OZ277 and SAR97276.

In the treatment of *P. falciparum* infections, the at least one, two or three additional anti-malarial agents may be selected from the following list, wherein at least one of the anti-malarial agents is an artemisinin-based agent: artemether+lumefantrine, artesunate+amodiaquine, artesunate+mefloquine, dihydroartemisinin+piperaquine, or artesunate+sulfadoxine-pyrimethamine (SP).

The above combination treatments are known as artemisinin-based combination therapies (ACTs). The choice of ACT is usually based on the results of therapeutic efficacy studies against local strains of *P. falciparum* malaria.

In the treatment of *P. vivax* infections, an ACT may be used, as described above. Alternatively, the at least one other anti-malarial agent may be chloroquine, particularly in areas without chloroquine resistant *P. vivax*. In areas where resistant *P. vivax* has been identified, infections may be treated with an ACT, as described above.

The combinations of therapeutic agents may conveniently be presented for use in the form of a pharmaceutical composition or formulation and may be administered together or separately and, when administered separately, this may occur separately or sequentially in any order (by the same or by different routes of administration).

The compositions or bacteria for use of the invention may be used in conjunction with use insecticide treated nets (ITNs), including long-acting insecticidal nets (LLINs) and/IRS (Indoor residual sprays). ATSB (attractive toxic sugar baits) lure mosquitos to feed on sugar with toxic mosquito-killing compounds. For efficiency, ATSB's could also include the *Delftia* bacteria or, as discussed above, use *Delftia* bacteria instead of the toxic compound.

The following non-limiting Examples illustrate the present invention.

EXAMPLES

Example 1

Isolation and Identification of Microorganisms from *Anopheles Stephensi* Mosquito Colony Following the Observation that this Colony that could not be Infected by *Plasmodium falciparum*

It was observed that a mosquito colony could not be infected by *Plasmodium falciparum* In an attempt to establish factors that could affect the loss of susceptibility to *Plasmodium falciparum* by GSK *Anopheles stephensi* mosquitoes, mosquito midgut tissues were studied, as well as reproductive fitness, survival and microbial flora present in different mosquito stages and environments that were used to breed these mosquitoes.

*Anopheles stephensi* mosquito colony was newly established in August 2012 with eggs imported from Imperial College, London. Female adult mosquitoes were routinely used for *Plasmodium falciparum* infection in the Standard Membrane Feeding Assay (SMFA) and mosquitoes showed good midgut oocyst mean intensity (between 2 to 25 oocysts per mosquito) and prevalence (80 to 100%). This colony gradually lost susceptibility to *Plasmodium falciparum* after one year of colonization. In the present study, we explored several different factors including microflora present in the different mosquito tissues and different breeding environments in the laboratory, breeding conditions, food, temperature, water among other factors which could contribute to loss in susceptibility.

Methods

Mosquito Survival & Reproductive Ability

Adult female mosquito mortality was monitored. Percentage of mosquitoes fed on mice blood (during breeding) and human blood (during SMFA) was noted. Egg production subsequent to feeding on mouse blood was also noted.

Sample Collection and Analysis from Incubators which were Used for Breeding Mosquitoes (Surfaces, Humidifiers and Water)

Sample Type: Swabs from Internal Walls of all Incubators (1-6)

Sample Source: The established areas for collection of swabs were from: internal floor, internal ceiling and two lateral walls on the insides Sampling Method: The established areas (described above) were swabbed with a stick having cotton at its base. Each of the swabs from the respective areas were placed in 5 mL of sterile LB medium in testubes. Individual testubes were marked with the date of collection, incubator number and sampling site inside the incubators.

These were then incubated at 37° C. on a rotary shaker and presence of turbidity was screened for at regular time intervals; O/N, 24 h, 48 h, 96 h Sample Type: Water Humidifier Source and Water Recipient in Incubators Used for Breeding Purposes (Incubators 5 &6)

Sample Source: Water from the Humidifier Container (In the case that the Water Container was empty, swabs were taken from inside the recipient and treated as described above). Sampling Method: 250 mL of water sample were collected in a sterile glass bottle from the water recipient. This was then filtered through a 0.22 micron filter placed in a Vacuum filtration apparatus. The filter was removed with a forceps and the placed in 5 mL of sterile LB medium in test tubes. The filter was then gently washed with LB. Individual testubes were marked with the date of collection, incubator number and sampling site inside the incubators.

These were then incubated at 37° C. on a rotary shaker and presence of turbidity was screened for at regular time intervals; O/N, 24 h, 48 h, 96 h Sample Analysis Results from above were tabulated in Xcel spreadsheets.

Select set of samples were sent for analysis for bacterial identification by an external Analytical Group (DYNAMIMED S.L.). Bacterial colonies were identified by biochemical characterization using standard biochemical tests.

Sample Collection of Mosquito Tissues (Eggs, Larvae, Whole Mosquitoes, Midguts)

Sample Source: Mosquito tissue from different developmental stages was freshly collected in sterile eppendorfs with 100 μl of sterile PBS and immediately stored at −80° C. for further use. Tissues included: eggs (which were collected from moistened filter paper); whole larvae from different stadia (10-12/tube); adult female mosquitoes were microdissected for midgut tissue and a total of 10-12 midguts were used; and whole adult female mosquitoes (10-12/tube)—No PBS added but stored directly in sterile eppendorfs at −80° C.

Analysis of Samples from Mosquito Tissues

Mosquito tissue samples were homogenized using a KONTES hand held automatic homogenizer fitted with sterile disposable pestles. Entire homogenates were transferred to sterile LB broth or YESP broth in glass test tubes (5-10 mL) and incubated at 27° C. on a rotary shaker. When turbidity was observed, samples were plated on solid agar (LB or YESP) to obtain single, pure distinct colonies. Single individual colonies were selected based on distinct colony morphology and transferred to fresh liquid media. Overnight grown cultures (500 μl) were mixed thoroughly with equal volume of 80% sterile glycerol and croperserved at −80° C.

Sample Analysis

Samples of bacteria isolated from the different tissues described above were sent identification by an external Analytical Group (DYNAMIMED S.L). Bacterial colonies were identified by biochemical characterization using standard biochemical tests.

Microscopic Observation of Midgut Tissues

Mosquitoes (adult females) of different ages post-emergence were dissected (Leica, M80) for midguts and these were either mounted in sterile PBS on a glass side OR incubated in 0.2% mercurochrome solution in D/W for 10-15 minutes. Individual midguts were observed using a light microscope (Leica, DM2000) with a 10× or 40× Objective (100× or 400× total magnification) or at 100× using oil immersion by placing a drop of oil on a glass coverslip.

Results

Mosquito Survival & Reproductive Ability

*Anopheles stephensi* CRESA colony was established in August 2012 in Tres Cantos facility with eggs imported from CRESA, Barcelona. The mosquito colony had originally been established in CRESA with eggs from Imperial College London (Robert Sinden Group). Survival, reproductive ability and overall quality of mosquitoes was not hampered over time. No unusual mortality of mosquitoes was observed. The percentage feeding on human blood was not less than 60% to 70% (which was the average feeding rate observed in mosquitoes from this colony).

TABLE 1

Results of identification of bacteria by biochemical characterization

| Samnples labelled as | Source | Sample Description | Bcteria Isolated |
|---|---|---|---|
| Larve stage 2 small colony | Larve stage 2 | Pure Colony—Small | *Pseudomonas oryzihabitans* |
| Larve Stage 2 Big Colony | Larve stage 2 | Pure Colony—Big | *Pseudomonas oryzihabitans* |

TABLE 1-continued

Results of identification of bacteria by biochemical characterization

| Samnples labelled as | Source | Sample Description | Bcteria Isolated |
|---|---|---|---|
| Larve stage 3 | Larve stage 3 | | *Pseudomonas oryzihabitans Staphylococcus aureus* |
| Water from Larve stage 3 | Water from Laral stage 3 | Sample in LB | *Pseudomonas oryzihabitans, Aerococcus viridans* |
| Pupa | pupa | Homogenate in LB | *Pseudomonas oryzihabitans* |
| MIDGUT AN STEPHENSI 6 DAY Before SMFA from room 1 | Midguts Day 6 Untreated | Homogenate in LB | *Pseudomonas oryzihabitans* |
| MIDGUT AN STEPHENSI 6 DAY After 3 days Pen-Strept Tr (before) SMFA | Midguts Day 6 1X PenStrep Treatment | Homogenate in LB | *Staphylococcus aureus* |
| MIDGUT 17 DAYS | Midguts Day 17 (Sugar Fed) | Homogenate in LB | *Enterobacter cloacae* |
| Midgut 26 days | Midguts Day 26 (Sugar Fed) | Homogenate in LB | *Pseudomonas oryzihabitans* |
| Room 1 37° C. Small | Midgut—Room 1 Mosquitoes | Pure Colony—Small at 37° C. | *Pseudomonas oryzihabitans* |
| Room 1 26° C. Small | Midgut—Room 1 Mosquitoes | Pure Colony—Small at 26° C. | *Pseudomonas oryzihabitans* |
| Room 1 Age 6 Small 26° C. | Midgut—Room 1 Mosquitoes, 6 days old | Pure Colony—Small at 26° C. | *Staphylococcus aureus* |
| Room 2 Age 20 | Midgut—Room 2 Mosquitoes, 20 days old | ? | *Candida* spp |
| Room 2 Age 20 26° C. | Midgut—Room 2 Mosquitoes, 20 days old | Pure Colony—at 26° C. | *Pseudomonas oryzihabitans* |
| YESP (Yeast Extract Agar) | Whole Midguts placed on Yeast Extract Agar | Whole Midgut | *Pseudomonas oryzihabitans* |

All of these samples showed the predominance of one major bacteria. identified initially by biochemical characterization (API strips from Biomerieux) as *Pseudomonas oryzihabitans*. These samples were reanalyzed by 16S rRNA typing and two different bacteria were identified; *Delftia tsuruhatensis* (FIG. 1) and *Pseudomonas putida*. The predominant bacteria was identified by 16S rRNA typing as *Delftia tsuruhatensis*. *Pseudomonas putida*, another bacteria was also isolated from mosquito tissues but it was not as predominant as *Delftia tsuruhatensis*.

Example 2

*Delftia tsuruhatensis* and Malaria Transmission: Proof of Concept Experiments for Establishing the Role of *Delftia tsuruhatensis* in Blocking *Plasmodium falciparum* Transmission The ability of *Delftia tsuruhatensis* to suppress *P. falciparum* infection in *Anopheles stephensi* mosquitoes was assessed.

*Anopheles stephensi* mosquito colony was newly established in August 2012 at GSK, Tres Cantos, Spain facilities with eggs imported from Imperial College, London. Female adult mosquitoes were being routinely used for *Plasmodium falciparum* infection in the Standard Membrane Feeding Assay (SMFA) and mosquitoes showed good midgut oocyst mean intensity (between 2 to 25 oocysts per mosquito) and prevalence (80 to 100%). This colony gradually lost susceptibility to *Plasmodium falciparum* after one year of colonization. Although colony fitness and reproductive ability were not compromised, we observed that mosquito midguts showed appearance of refractile microscopic crystal-like structures dispersed throughout the membrane and the absence of any oocysts. Mosquito tissue was screened for the presence of both fungi and bacteria and we confirmed the presence of at least one bacterial species which was predominantly present in all the tissues. We explored several different factors including breeding conditions, food, temperature, water which could contribute to loss in susceptibility. One of the factors that could have contributed to such an over abundance of bacteria of a particular type could be related to the breeding protocol in use at that time. The mosquito colony was discontinued because of lack of susceptibility to *Plasmodium*. Mosquito Tissue samples (larvae, male and female adults, midgut tissue) have been preserved at −80° C. The predominant bacteria was identified by 16S rRNA typing as *Delftia tsuruhatensis*. *Pseudomonas putida*, another bacteria was also isolated from mosquito tissues but it was not as predominant as *Delftia tsuruhatensis*.

Processing of Cryopreserved Mosquito Tissue Samples

Cryopreserved tissue samples of *Anopheles stephensi* larvae and adult female midgut were selected from GSK glycerol stocks stored at −80° C. after growing in LB broth at 27° C. These samples were obtained from the *Anopheles stephensi* colony established in 2012, which had failed to transmit *Plasmodium falciparum*. Three different vials, labelled as number 5, 11 and 28 were selected;

No. 5=Midguts from 5-8 days old mosquitoes.

No. 11=Midguts from adults 26-30 days old.

No. 28=Big colony isolated from homogenized stage II larvae.

In order to isolate individual colonies from each sample, a sterile loop was introduced in each tube and innoculated into 20 ml of LB broth maintained at 37° C. overnight at 200 rpm (*Delftia*. can grow at both 37° C. and 27° C.). Samples were streaked on LB plates and kept at 37° C. for 24-48 h. Pure colonies were sent for identification to an external laboratory (DYNAMIMED S.L.). All of these samples showed the predominance of one major bacteria sp. identified initially by biochemical characterization (API strips from Biomerieux) as *Pseudomonas oryzihabitans*. But later, these samples were reanalyzed by 16S rRNA typing and two different bacteria were identified; *Delftia tsuruhatensis*(FIG. 1) and the other *Pesudomonas putida*. FIG. 1 shows colony morphology of *Delftia tsuruhatensis*: cream white circular colony, Gram-negative, rod-shaped, catalase- and oxidase-positive, motile bacterium from the Comamonadaceae family Mosquito Rearing and Antibiotic Treatment for Removal of Bacterial Flora from Midgut Cyclic colonies of *Anopheles stephensi* were maintained in climate controlled chambers at 26.5±1° C., 14 L:10D photoperiod and a 75±5% RH (Panasonic MLR352 PE). Adults, kept in insect rearing cages (30×30×30 cm; Bugdorm®), had ad libitum access to 10% sucrose (SigmaAldrich® S7903)/water solution+1% Karo® syrup. Larvae were reared in plastics trays (20×15×6 cm) in groups of 250 larvae/tray and fed on powdered Tetra® Goldfish sticks.

For removal of mosquito midgut normal bacterial flora, newly emerged mosquitoes were fed on 10% sucrose solution in sterile distilled water with 1× Penicillin Streptomycin [Sigma-Aldrich®, P4333] and 0.4% Gentamycin [Sigma-Aldrich®, G1397]. Cottons are replaced with fresh antibiotic solution every 48 hrs. Female mosquitoes were gently transferred to cardboard containers sealed with double netting, two days prior to performing experiments. These mosquitoes were starved overnight by depriving them of sugar soaked cottons. To determine if the antibiotic treatment was effective, midguts from 10-12 mosquitoes were dissected, homogenized in PBS and plated on LB Agar.

Bacterial sample preparation and re-population of *An. stephensi* midguts Bacterial sample for introduction into mosquitoes was prepared using a pure colony of *Delftia tsuruhatensis* from LB plate (see FIG. 1). Single bacterial colonies were grown in 100 ml LB broth overnight at 37° C. and 200 rpm to OD600 of 1.0 {$10^6$ Colony Forming Units (CFUs)/ml}. 8 ml culture was pelleted (centrifuge 2 min, 10,000 g), washed twice in 10% sucrose solution, and finally resuspended in 4 ml of 10% sucrose solution (Final OD600 of around 2.0). This suspension was introduced into a small (5 mL) glass test tube covered with a cotton plug. The tube is turned over to let the cotton completely absorb the suspension and subsequently introduced into the cup of mosquitoes to allow for feeding. On the day of the experiment, mosquitoes were allowed to feed for 2 hours on cotton soaked with 10% sugar solution+bacteria. Antibiotic treated mosquitoes (40 to 50 female adults/cup as described above) were starved for 24 h before feeding on this bacterial suspension. Subsequently, all cottons were replaced with fresh cottons soaked in 10% sugar solution. Untreated mosquitoes (Control) were provided with a 10% sucrose solution without bacterial suspensions.

Enumeration of Bacterial Loads from Mosquito Midguts

Mosquitoes were carefully dissected under a stereomicroscope, in a glass slide containing sterile PBS. Midguts from 10 female mosquitoes (in each treatment) were quickly introduced into 100 μL sterile PBS in 1.5 mL eppendorf tubes. Samples were homogenized using hand held homogenizer and serially dilutions performed. 100 μL of each dilution was plated on LB agar plates incubated at 37° C. for 24-48 h. Bacteria colonies was counted and CFU/ml was determined.

Role of *Delftia tsuruhatensis* in *Plasmodium falciparum* Transmission

To determine the role of *Delftia tsuruhatensis* in *Plasmodium* transmission, mosquitoes populated with bacteria (as described above) were fed on mature gametocytes in the SMFA as described below. Table 1 describes the different treatments in the Control and Test groups.

TABLE 1

Experiment treatment design to determine the establishment of *D. tsuruhatensis* in the female mosquito midgut (Treatment 1 & 2) and the role of *D. tsuruhatensis* in Plasmodium transmission (Treatment 3).

| Treatment | Control | Test |
|---|---|---|
| 1 | Sugar | Sugar + Bacteria |
| 2 | Sugar + Blood | Sugar + Bacteria + Blood |
| 3 | Sugar + Blood + Plasmodium | Sugar + Bacteria + Blood + Plasmodium |

Gametocyte Production

Gametocyte cultures were generated from *P. falciparum* NF54 gametocyte producing strain kindly provided by M. Delves (Imperial College, London). Asexuals were maintained in RPMI medium with 10% human serum at a maximum of 1% total parasitemia. Gametocyte culture protocol was adapted from that described by Ifediba and Vanderberg (1981). Gametocyte induction was initiated at 0.5% parasitemia (>70% rings) and 4% hematocrit in RMPI medium with 5% human serum A+ and 0.5% Albumax {Gametocyte Production Medium RPMI 1640 (Sigma R5886) 1500 ml, 30 mM Bicarbonate (Sigma-Aldrich S5761), 5 mM Hypoxanthine (Gibco 11067-030). Media was made complete with 5% human serum A+ and 0.5% Albumax.}.

Cultures were maintained for up to 20 days with daily media change and without addition of fresh RBC. At day 13 to 15 post-induction, media was replaced with serum only gametocyte treatment media {RPMI1640 (15.87 g) with L-glutamine and 25 mM HEPES (Gibco 13018-031), 10 mM Glucose (Sigma-Aldrich G8270); 20 mM Bicarbonate (Sigma-Aldrich S5761); 5 mM Hypoxanthine (Gibco 11067)/L. Media was made complete with 10% of human A+ serum (Interstate Blood Bank)}. Cultures were monitored daily after day 13 using Giemsa stained smears for Stage V gametocytemia, male and female gametocyte ratio and by performing exflagellation assay for viability.

Standard Membrane Feeding Assay (SMFA)

Two days before the start of the SMFA, antibiotic treated mosquitoes, were fed with *Delftia* sp. as described above. On the day of the feed, mature gametocyte cultures were centrifuged at 2500×g for 3 minutes at 37° C. The supernatant was removed and the pellet was diluted 1:1 with 100% packed cell volume of fresh human RBC's and finally formulated as artificial mosquito blood meals at 50% hematocrit with pre-warmed human serum. All steps were performed at 37° C. Blood meal without gametocytes was prepared in a similar manner. Prepared blood meals were fed in duplicate to female *An. stephensi* mosquitoes for a duration of 30-40 minutes via Parafilm membrane attached to glass feeders (Fisher Scientific, #12831283) connected to a 37° C. circulating water bath. Fed mosquitoes were maintained in an incubator at 26.5±1° C., 14 L:10D photoperiod and a 75±5% RH. Mosquitoes were carefully dissected for midguts at 24 hrs post blood-feeding and bacterial numbers were determined as described above. For enumeration of midgut oocysts, mosquitoes with fully developed ovaries (fed mosquitoes) were dissected (Leica, M80) for midguts 7-8 days post-feeding and incubated in 0.2% mercurochrome solution in D/W for 10-15 minutes. Total number of oocysts in individual midguts were counted using a light microscope (Leica, DM2000) using a 10× Objective (100× magnification). Both, infection prevalence (percentage of mosquitoes with one or more oocyst) and mean oocyst intensity of infection was defined in each treatment.

Results

*Delftia tsuruhatensis* could Successfully Establish in *An. Stephensi* midguts

To determine if *Delftia* sp. *Delftia tsuruhatensis*) was effective in populating mosquito midguts, *Delftia*-fed mosquitoes were dissected at two different time points; before infective blood (SMFA) feeding and 24 hours after blood feeding. Midguts from 10 mosquitoes were pooled, homogenized in 100 μL of PBS and plated on LB agar and CFU's were determined. Only one type of colony was observed. The colony morphology and characteristics of the retrieved bacteria (although very low in number) was identical to *Delftia* sp., thereby confirming that *Delftia* sp. could populate the mosquito midgut (Table 2). After blood feeding, the number of bacteria increased two to three orders of magnitude (consistent with reports/studies that show increase in midgut flora post blood feeding). Mosquito midguts from the Control Untreated groups did not show presence of any colonies, both, before and after blood feeding, proving the effectiveness of the gentamycin-Penicillin Streptomycin treatment in removing indigenous bacterial flora (Table2).

TABLE 2

*Delftia* sp. bacteria recovered from female *An. stephensi* midguts before and after feeding on blood.
The table show the log CFU/ml in the control and test groups.

| | − bacteria Control (log CFU/ml) | + bacteria Test (log CFU/ml) |
|---|---|---|
| Bacterial load before blood feeding | 0 | 1-2 |
| Bacterial load 24 h after blood feeding | 0 | 5 |

Figure 2A:
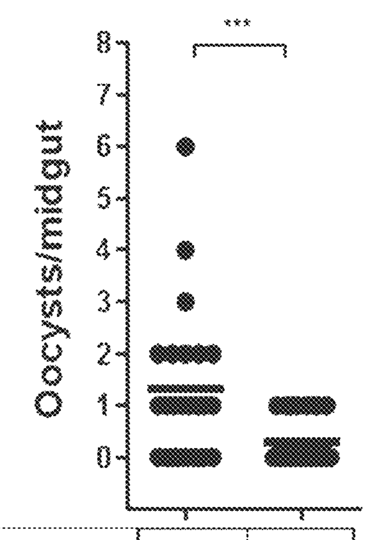
FIG. 2A-FIG. 2B shows the effect of *D. tsuruhatensis* on *P. falciparum* oocyst intensity. Each dot represents the total number of oocysts in a single mosquito midgut and the horizontal line depicts the mean oocyst intensity of infection. The Mann Whitney Test was used to compare the statistical significance between the different treatments and the control. (Treatments which show a statistically significant distribution are represented with asterisks: $p<0.1$, $p<0.01$, $p<0.001$, $p<0.0001$ is represented by *, , *, ** respectively and ns=non-significant). The Table below the graph depicts the total number of full-fed mosquitoes dissected per treatment, the % prevalence of infection, transmission blocking potential, mean oocyst intensity reduction and the mean oocyst intensity. The percentage transmission blocking potential and mean oocyst intensity reduction were calculated by normalizing with values from the Control group.
Figure 2B:
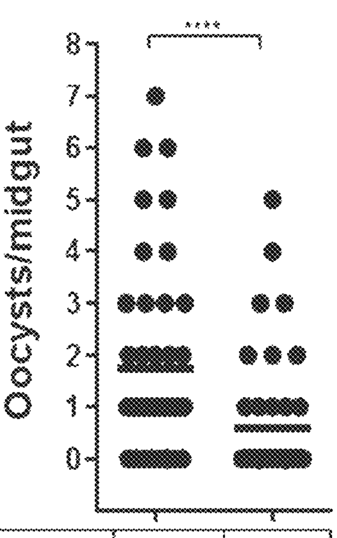

D. *Tsuruhatensis* Significantly Reduced *Plasmodium falciparum* Mean Oocyst Intensity and Prevalence of Infection in *An. Stephensi* Mosquitoes More than 70% reduction in mean oocyst intensity was observed in re-populated mosquitoes compared to un-treated controls. Results showed a block in transmission higher than 60% in the treated mosquitoes (FIG. 2A-FIG. 2B)

Gentamycin Penicillin Streptomycin treatment employed was successful in removal of indigenous culturable bacterial midgut flora present in GSK *An. stephensi* mosquitoes. *D. tsuruhatensis* bacterial population was successfully detected in midguts from mosquitoes which had been sugar fed or blood fed. Blood fed mosquitoes showed a two to three fold increase in bacteria numbers compared to sugar fed mosquitoes, at 24 hours post-bloodmeal. More than 70% reduction in *P. falciparum* mean oocyst intensity and 60% block in transmission was detected compared to un-treated controls. *P. falciparum* ookinete invasion of the mosquito midgut occurs between 16 to 24 hours post blood feeding. During this time (24 hrs post blood feeding) only *D. tsuruhatensis* bacterial colonies were retrieved from mosquito midguts suggesting the direct involvement of *D. tsuruhatensis* in reducing *P. falciparum* oocyst numbers.

The invention claimed is:

1. A method of suppressing *Plasmodium falciparum* malaria parasite transmission comprising administering to one or more adult *Anopheles* mosquitoes in a colony a composition comprising *Delftia tsuruhatensis* bacteria in pure form, thereby suppressing the *Plasmodium falciparum* malaria parasite transmission in the colony.

2. The method according to claim 1, wherein the *Anopheles* mosquito is *Anopheles gambiae* or *Anopheles stephensi.*

3. The method according to claim 2, wherein the *Anopheles* mosquito is *Anopheles stephensi.*

4. A method of inhibiting ookinetes and oocysts of *Plasmodium falciparum* in *Anopheles* mosquito midgut comprising administering to one or more adult *Anopheles* mosquitoes in a colony a composition comprising *Delftia tsuruhatensis* bacteria in pure form, thereby inhibiting the ookinetes and oocysts of *Plasmodium falciparum* in adult *Anopheles* mosquitoes' midgut in the colony.

5. The method according to claim 1, wherein the composition further comprises a food component, and wherein the food component is an artificial nectar or sugar bait.

6. The method according to claim 4, wherein the composition further comprises a food component, and wherein the food component is an artificial nectar or sugar bait.

* * * * *